United States Patent
Takae et al.

(10) Patent No.: US 11,115,797 B2
(45) Date of Patent: Sep. 7, 2021

(54) WIRELESS COMMUNICATION APPARATUS, WIRELESS COMMUNICATION METHOD, AND WIRELESS COMMUNICATION SYSTEM

(75) Inventors: Shinji Takae, Tokyo (JP); Katsutoshi Itoh, Tokyo (JP); Tomoya Yamaura, Tokyo (JP); Masanori Sato, Tokyo (JP); Hideyuki Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 2 days.

(21) Appl. No.: 13/359,771

(22) Filed: Jan. 27, 2012

(65) Prior Publication Data

US 2012/0218918 A1 Aug. 30, 2012

(30) Foreign Application Priority Data

Feb. 24, 2011 (JP) .............................. JP2011-038158

(51) Int. Cl.
*H04W 48/16* (2009.01)
*H04W 8/00* (2009.01)

(52) U.S. Cl.
CPC ................... *H04W 8/005* (2013.01)

(58) Field of Classification Search
USPC ............................ 709/224; 370/338; 345/440
See application file for complete search history.

(56) References Cited

U.S. PATENT DOCUMENTS

| 6,629,269 | B1 * | 9/2003 | Kahkoska | ........... | H04L 41/24 |
| | | | | | 714/43 |
| 2003/0061364 | A1 * | 3/2003 | Banerjee | ........... | H04L 12/14 |
| | | | | | 709/229 |
| 2003/0065773 | A1 * | 4/2003 | Alba et al. | ........... | 709/224 |
| 2004/0242265 | A1 * | 12/2004 | Kawamura | ........... | 455/550.1 |
| 2004/0264916 | A1 * | 12/2004 | Van De Sluis | ........... | H04M 1/7253 |
| | | | | | 386/200 |

(Continued)

FOREIGN PATENT DOCUMENTS

| AU | 2002366409 A1 | 6/2003 |
| BR | P10805014 A2 | 8/2009 |

(Continued)

OTHER PUBLICATIONS

Usability Expert Group, "Bluetooth User Interface Flow Diagrams for Bluetooth Secure Simple Pairing Devices", Sep. 13, 2007, p. 1-54, Revision V1.0, XP-002668327.

(Continued)

*Primary Examiner* — Kevin C. Harper
*Assistant Examiner* — Derrick V Rose
(74) *Attorney, Agent, or Firm* — Chip Law Group

(57) ABSTRACT

Provided is a wireless communication apparatus including an application, a communication control unit for controlling a search process for discovering at least one peripheral wireless communication apparatus and a connection process to a peripheral wireless communication apparatus, and a display control unit for generating a display screen including display of the at least one peripheral wireless communication apparatus discovered by the search process. The communication control unit starts control of the search process by start of the application, and controls the connection process to a wireless communication apparatus selected on the display screen.

12 Claims, 12 Drawing Sheets

(56) References Cited

U.S. PATENT DOCUMENTS

| | | | |
|---|---|---|---|
| 2005/0049933 A1* | 3/2005 | Upendran | G06Q 30/02 705/26.41 |
| 2005/0073522 A1* | 4/2005 | Aholainen et al. | 345/440 |
| 2006/0280447 A1* | 12/2006 | Ozaki | H04L 43/0817 386/243 |
| 2007/0141988 A1 | 6/2007 | Kuehnel et al. | |
| 2008/0034081 A1* | 2/2008 | Marshall | G08C 17/02 709/223 |
| 2008/0057930 A1 | 3/2008 | Matsubara | |
| 2008/0122796 A1* | 5/2008 | Jobs | G06F 3/0488 345/173 |
| 2009/0016281 A1 | 1/2009 | Isozu et al. | |
| 2009/0270093 A1 | 10/2009 | Lee | |
| 2009/0296601 A1* | 12/2009 | Citrano, III | H04L 63/062 370/254 |
| 2010/0195539 A1* | 8/2010 | Tian et al. | 370/255 |
| 2010/0297939 A1 | 11/2010 | Fujita | |
| 2011/0149806 A1* | 6/2011 | Verma | H04L 12/2809 370/255 |
| 2012/0009924 A1 | 1/2012 | Lee | |
| 2012/0062564 A1* | 3/2012 | Miyashita | G06F 1/1626 345/419 |
| 2012/0208514 A1* | 8/2012 | Park | G06F 3/0484 455/418 |
| 2012/0243524 A1* | 9/2012 | Verma et al. | 370/338 |

FOREIGN PATENT DOCUMENTS

| | | |
|---|---|---|
| BR | PI0711371 A2 | 11/2011 |
| CA | 2651236 A1 | 11/2007 |
| CN | 1602625 A | 3/2005 |
| CN | 101146004 A | 3/2008 |
| CN | 101466162 A | 6/2009 |
| EP | 1459525 A1 | 9/2004 |
| EP | 2018720 A2 | 1/2009 |
| EP | 2073514 A | 6/2009 |
| EP | 2073514 A2 | 6/2009 |
| JP | 2005-524253 A | 8/2005 |
| JP | 2008-061111 A | 3/2008 |
| JP | 2008-85455 | 4/2008 |
| JP | 4266960 B2 | 5/2009 |
| JP | 2011-004389 A | 1/2011 |
| JP | 5000711 B2 | 8/2012 |
| JP | 5060627 B2 | 10/2012 |
| KR | 2004-0062992 A | 7/2004 |
| KR | 10-2009-0026132 A | 3/2009 |
| KR | 10-2009-0026132 A2 | 3/2009 |
| KR | 10-2009-0066103 A | 6/2009 |
| RU | 2008145037 A | 5/2010 |
| TW | 200801969 A | 1/2008 |
| WO | 03/053048 A1 | 6/2003 |
| WO | 2007/136622 A2 | 11/2007 |

OTHER PUBLICATIONS

Extended European Search Report Received for Application No. 12155948.8, dated Apr. 7, 2015.
Office Action Received for Chinese Patent Application No. 201210018662.2, dated Jul. 22, 2016, 17 Pages of Office Action Including 10 Pages of English Translation.
Office Action received for European Patent application No. 12155948.8, dated Jul. 1, 2016, 6 pages of office action.
Office Action for CN Patent Application No. 201210018662.2, dated Dec. 14, 2016, 07 pages of Office Action and 09 pages of English Translation.
Extended European Search Report of EP Patent Application No. 17185004.3, dated Nov. 3, 2017, 09 pages.
"Bluetooth User Interface Flow Diagrams for Bluetooth Secure Simple Pairing Devices", Bluetooth SIG Confidential, (Usability Expert Group), XP-002668327, vol. 1.0, Sep. 13, 2007, 54 pages.
Extended European Search Report of EP Patent Application No. 18179607.9, dated Sep. 11, 2018, 11 pages.
Office Action for CN Patent Application No. 201710673012.4, dated Nov. 4, 2019, 10 pages of Office Action and 15 pages of English Translation.
Extended European Search Report of EP Application No. 20166595.7 dated Sep. 18, 2020, 09 pages.

* cited by examiner

WIRELESS COMMUNICATION APPARATUS, WIRELESS COMMUNICATION METHOD, AND WIRELESS COMMUNICATION SYSTEM

BACKGROUND

The present disclosure relates to a wireless communication apparatus, a wireless communication method, a program, and a wireless communication system.

These days, IEEE 802.11 is widely spread as wireless communication standards. This IEEE 802.11 defines a communication method called an infrastructure mode where a plurality of wireless communication apparatuses perform communication via an access point, and a communication method called an ad-hoc mode where a plurality of wireless communication apparatuses communicate with each other directly without using an access point. In either case of the communication methods, a user performs setup for connection in advance.

For example, in the infrastructure mode, first, a wireless communication apparatus searches for peripheral access points, and the user selects a connection destination from the access points which have been discovered. Here, at the time of selecting an access point to be the connection destination, the user has to set as connection information a network identifier called an SSID (Service Set Identifier). Also, to ensure security, many access points have a function of encrypting wireless communication enabled. Thus, in the case of selecting an access point with an enabled encryption function, the user has to set an encryption key. Furthermore, it may also become necessary to perform setting for an encryption method such as a TKIP (Temporal Key Integrity Protocol) or a CCMP (Counter Mode with Cipher Block Chaining Message Authentication Code Protocol), or an authentication method such as a WPA-PSK (Wi-Fi Protected Access Pre-Shared Key) or a WPA2-PSK.

As described, since expertise was necessary for connection setup, it was difficult for a user with no knowledge regarding connection setup to perform connection of a wireless communication apparatus.

With respect to this point, a standard for simple connection called WPS (Wi-Fi Protected Setup) has been developed by Wi-Fi Alliance. This WPS defines a PIN (Personal Identification Number) method where a particular digit sequence is input to both of the two wireless communication apparatuses to be connected, and a PBC (Push Button Configuration) method where particular buttons on both of the two wireless communication apparatuses to be connected are pushed. A user can exchange setup information by two wireless communication apparatuses using either of these methods.

Furthermore, besides WPS, many methods are being proposed to simplify connection setup. For example, JP-2008-85455A discloses a method of storing setup information of an access point in a removable storage medium such as an USB memory, attaching this storage medium to a wireless communication apparatus, and automatically reading, by the wireless communication apparatus, the setup information from the storage medium.

SUMMARY

However, although connection setup has been simplified by WPS, further simplification of connection setup is desired. Also, the method described in JP-2008-85455A can be realized if an access point can have a storage medium such as an USB memory attached thereto and the access point has a function of writing the setup information in the attached storage medium, but it is difficult to apply the method to an access point not having these functions. Additionally, a similar issue arises also in the case of connecting the wireless communication apparatus not to an access point but to another wireless communication apparatus.

In light of the foregoing, it is desirable to provide a wireless communication apparatus, a wireless communication method, a program, and a wireless communication system which are novel and improved, and which are capable of allowing connection setup to be performed more easily.

According to an embodiment of the present disclosure, there is provided a wireless communication apparatus which includes an application, a communication control unit for controlling a search process for discovering at least one peripheral wireless communication apparatus and a connection process to a peripheral wireless communication apparatus, and a display control unit for generating a display screen including display of the at least one peripheral wireless communication apparatus discovered by the search process. The communication control unit starts control of the search process by start of the application, and controls the connection process to a wireless communication apparatus selected on the display screen.

The communication control unit may control, in the search process, communication for inquiring of the at least one peripheral wireless communication apparatus about presence/absence of a function corresponding to the application. The display screen generated by the display control unit may include display of a wireless communication apparatus, among the at least one peripheral wireless communication apparatus, having the function corresponding to the application.

The display screen generated by the display control unit may include display of the at least one peripheral wireless communication apparatus and display corresponding to each of at least one piece of content data. When any of the at least one peripheral wireless communication apparatus and any of the at least one piece of content data are selected on the display screen, the communication control unit may control the connection process to the selected wireless communication apparatus and, after the connection process, control transmission of the selected content data.

The display control unit may generate a list display of functions in a case the wireless communication apparatus selected on the display screen has a plurality of functions corresponding to the application. The communication control unit may perform control for notifying the wireless communication apparatus selected on the display screen of a function selected from the list display.

The display control unit may change display, on the display screen, of the at least one peripheral wireless communication apparatus depending on whether an operation on the at least one peripheral wireless communication apparatus is necessary for the connection process or not.

According to another embodiment of the present disclosure, there is provided a wireless communication method which includes starting an application, performing a search process for discovering at least one peripheral wireless communication apparatus, generating a display screen including display of the at least one peripheral wireless communication apparatus discovered by the search process, and performing a connection process to a wireless communication apparatus selected on the display screen.

According to another embodiment of the present disclosure, there is provided a program for causing a computer to function as a wireless communication apparatus including an application, a communication control unit for controlling a search process for discovering at least one peripheral wireless communication apparatus and a connection process to a peripheral wireless communication apparatus, and a display control unit for generating a display screen including display of the at least one peripheral wireless communication apparatus discovered by the search process. The communication control unit starts control of the search process by start of the application, and controls the connection process to a wireless communication apparatus selected on the display screen.

According to another embodiment of the present disclosure, there is provided a wireless communication system which includes at least one first wireless communication apparatus, and a second wireless communication apparatus including an application, a communication control unit for controlling a search process for discovering the first wireless communication apparatus and a connection process to the first wireless communication apparatus, and a display control unit for generating a display screen including display of the first wireless communication apparatus discovered by the search process. The communication control unit starts control of the search process by start of the application, and controls a first wireless communication apparatus selected on the display screen.

According to the embodiments of the present disclosure described above, it is possible to perform connection setup more easily.

DETAILED DESCRIPTION OF THE EMBODIMENT(S)

Figure 1:
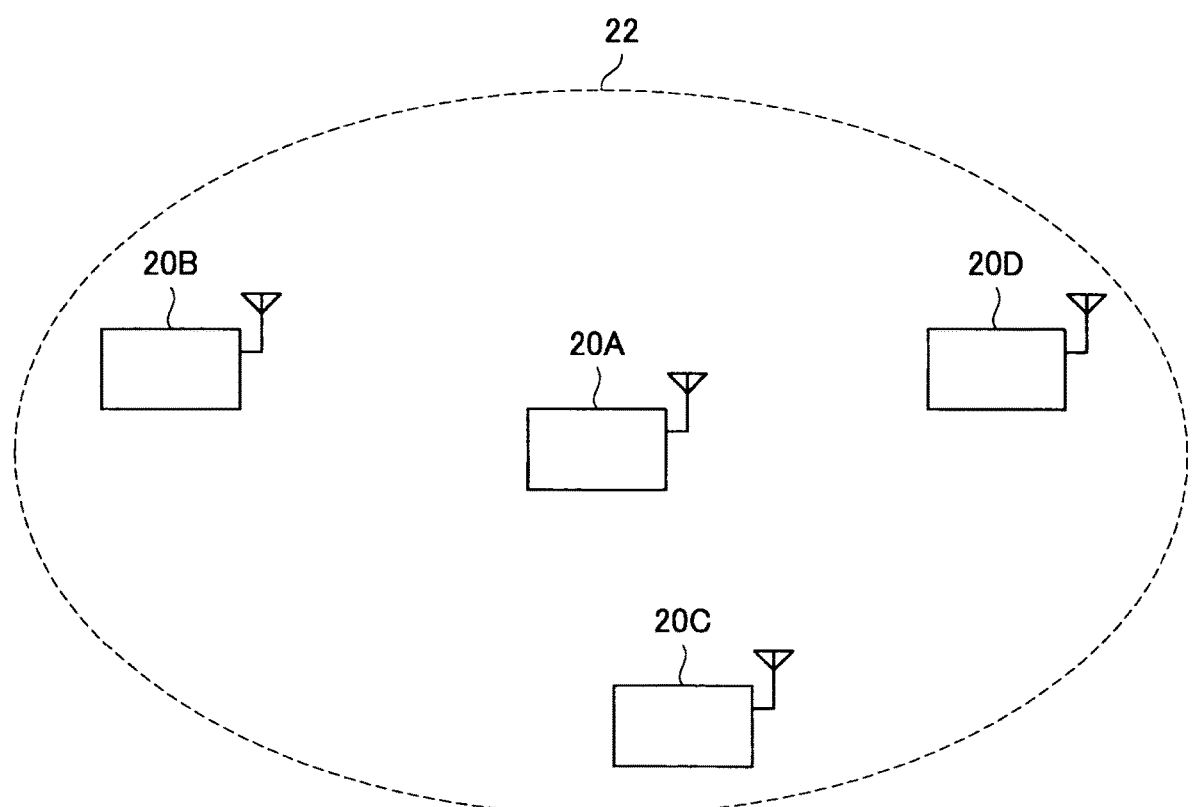
FIG. 1 is an explanatory diagram showing a configuration of a wireless communication system according to an embodiment of the present disclosure.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

Also, in this specification and the drawings, a plurality of structural elements having substantially the same functional configuration may be distinguished from each other by each having a different letter added to the same reference numeral. For example, a plurality of elements having substantially the same functional configuration are distinguished from each other as necessary as wireless communication apparatuses 20A, 20B, and 20C. However, if it is not particularly necessary to distinguish each of a plurality of structural elements having substantially the same functional configuration, only the same reference numeral is assigned. For example, if it is not particularly necessary to distinguish between the wireless communication apparatuses 20A, 20B, and 20C, they are simply referred to as the wireless communication apparatus(es) 20.

Furthermore, "DETAILED DESCRIPTION OF THE EMBODIMENT(S)" will be described in the following order.

1. Configuration of Wireless Communication System
2. Configuration of Wireless Communication Apparatus
3. Operation of Wireless Communication Apparatus
3-1. First Operation Example
3-2. Second Operation Example
3-3. Third Operation Example
4. Conclusion 1. Configuration of Wireless Communication System FIG. 1 is an explanatory diagram showing a configuration of a wireless communication system according to an embodiment of the present disclosure. The wireless communication system according to an embodiment of the present disclosure includes a plurality of wireless communication apparatuses 20. In FIG. 1, a wireless communication apparatus 20A, and wireless communication apparatuses 20B, 20C, and 20D existing in a communicable range of the wireless communication apparatus 20A are shown as examples of the plurality of wireless communication apparatuses 20, for example.

The wireless communication apparatus 20 forms a communication group by directly connecting to peripheral wireless communication apparatuses 20, and is thereby enabled to communicate with the peripheral wireless communication apparatuses 20 without a dedicated access point or the like.

For example, the wireless communication apparatus 20A determines, according to Wi-Fi Direct developed by Wi-Fi Alliance, whether to act as a group owner or a client at the time of connecting to a peripheral wireless communication apparatus 20. Specifically, the wireless communication apparatus 20A exchanges with the wireless communication apparatus 20B, 20C, or 20D in the periphery parameters indicating a priority for acting as a group owner, compares the parameters indicating the priority, and determines whether to act as a group owner or a client. Then, the wireless communication apparatus 20A connects with the wireless communication apparatus 20B, 20C, or 20D in the periphery according to the determined topology (relationship of group owner and client).

The wireless communication apparatus 20 as described above may be an information processing apparatus such as a PC (Personal Computer), a home video recorder, a home game console, a home appliance, a mobile phone, a PHS (Personal Handyphone System), a portable music playback device, a portable video processing device, a display device, an audio output device, or the like, for example.

Furthermore, data that the wireless communication apparatus 20 communicates with a peripheral wireless communication apparatus 20 may be audio data such as music, a lecture, a radio program, or the like, visual data such as a television program, a motion picture, a video program, a photograph, a document, a painting, a diagram, or the like, or content data of a game, software, or the like.

Incidentally, in the comparative example of the present disclosure, advance setup for connecting a wireless communication apparatus to an access point or another wireless communication apparatus was necessary. For example, in the infrastructure mode, first, a wireless communication apparatus searches for peripheral access points, and a user selects a connection destination from the access points which have been discovered. At the time of selecting an access point to be the connection destination, the user has to set as connection information a network identifier called an SSID. Also, to ensure security, many access points have the function of encrypting wireless communication enabled. Thus, in the case of selecting an access point with an enabled encryption function, the user has to set an encryption key. Furthermore, it may also become necessary to perform setting for an encryption method such as a TKIP or a CCMP, or an authentication method such as a WPA-PSK or a WPA2-PSK.

As described, since expertise was necessary for connection setup, it was difficult for a user with no knowledge regarding connection setup to perform connection of a wireless communication apparatus.

With respect to this point, a standard for simple connection called WPS has been developed by Wi-Fi Alliance. This WPS defines a PIN method where a particular digit sequence is input to both of the two wireless communication apparatuses to be connected, and a PBC method where particular buttons on both of the two wireless communication apparatuses to be connected are pushed. In the following, a connection process by WPS as described will be described with reference to FIG. 2. Additionally, a process for a case where a wireless communication apparatus according to the comparative example connects to an access point is shown in FIG. 2, but a similar process is performed also for a case where wireless communication apparatuses according to the comparative example connect to each other.

Figure 2:
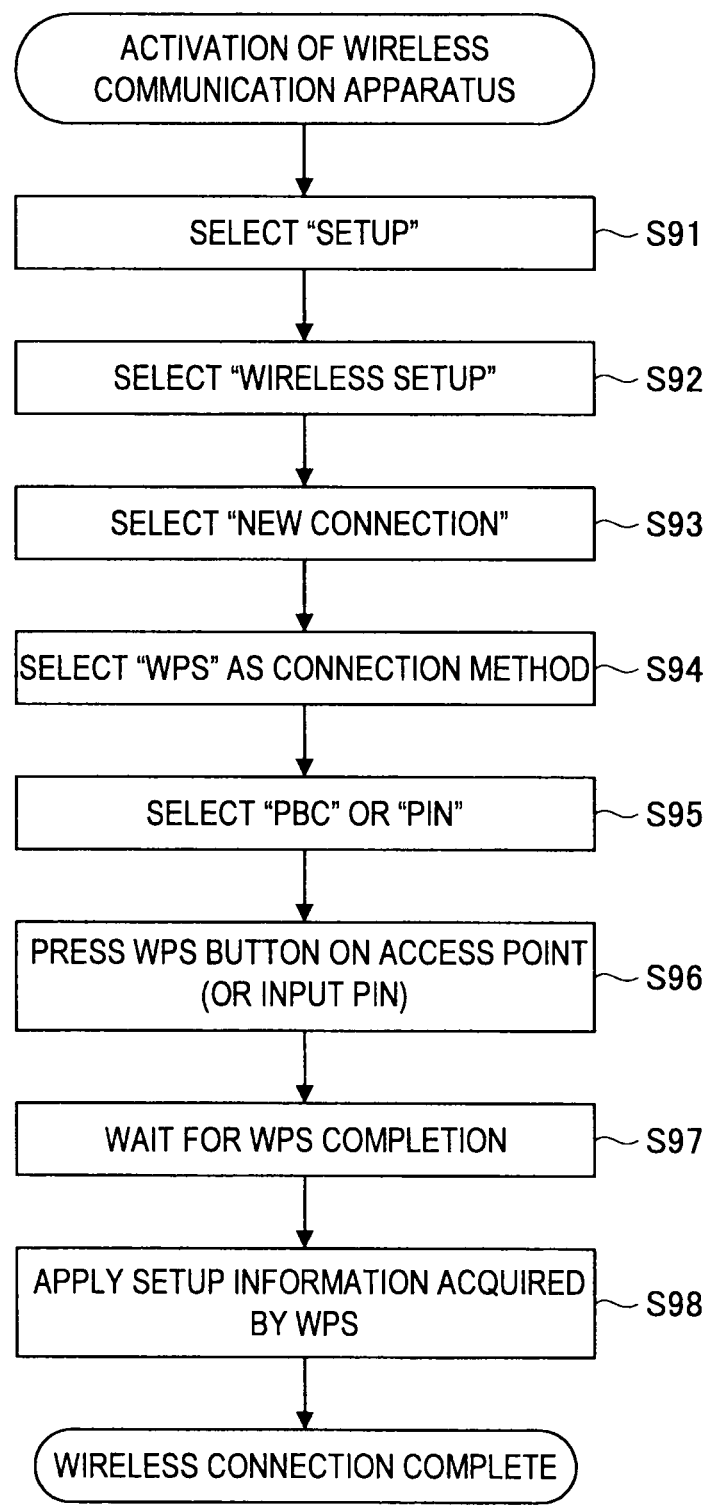
FIG. 2 is a flow chart showing a connection process by WPS.

FIG. 2 is a flow chart showing a connection process by WPS. In the case of connecting a wireless communication apparatus to an access point by WPS, a user of the wireless communication apparatus first selects "setup" on a menu screen of the wireless communication apparatus (S91). Next, the user selects "wireless setup" on a selection screen of the wireless communication apparatus (S92), and selects "new connection" (S93).

Next, the user selects "WPS" on a connection method selection screen of the wireless communication apparatus (S94), and selects "PBS" or "PIN" on a method selection screen (S95). Then, in the case of selecting "PBS," the user presses a WPS button on the access point (S96). Additionally, in the case of selecting "PIN," the user inputs a PIN.

Then, the user waits for completion of WPS (S97), and the wireless communication apparatus connects, automatically or according to a user instruction, to the access point by applying setup information acquired by WPS (S98).

As described, even though the connection setup is simplified according to WPS, operation of the wireless communication apparatus is performed by the user five or six times in total as shown by S91 to S96 and S98. It is bothersome for the user to perform many operations on the wireless communication apparatus as described with the connection setup in mind. Additionally, a similar issue arises also in the case of connecting the wireless communication apparatus not to the access point but to another wireless communication apparatus.

Accordingly, the wireless communication apparatus 20 according to an embodiment of the present disclosure has been achieved in view of the above circumstance. The wireless communication apparatus 20 according to an embodiment of the present disclosure is capable of realizing a simpler connection setup that is closely related to start of an application. In the following, such a wireless communication apparatus 20 according to an embodiment of the present disclosure will be described in detail.

2. Configuration of Wireless Communication Apparatus (Hardware Configuration)

Figure 3:
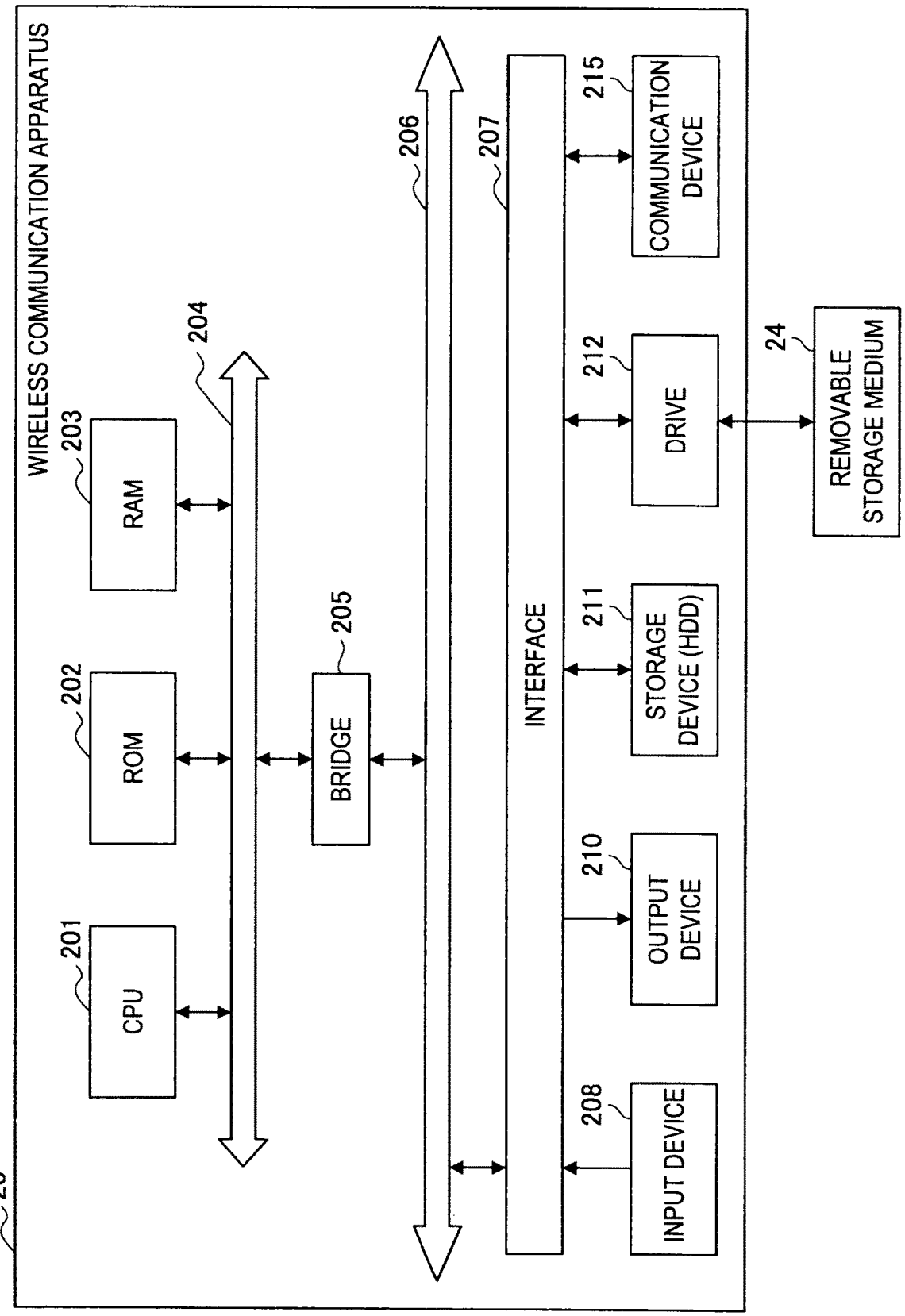
FIG. 3 is a block diagram showing a hardware configuration of a wireless communication apparatus according to an embodiment of the present disclosure.

FIG. 3 is a block diagram showing a hardware configuration of the wireless communication apparatus 20 according to an embodiment of the present disclosure. The wireless communication apparatus 20 includes a CPU (Central Processing Unit) 201, a ROM (Read Only Memory) 202, a RAM (Random Access Memory) 203, and a host bus 204. The wireless communication apparatus 20 also includes a bridge 205, an external bus 206, an interface 207, an input device 208, an output device 210, a storage device (HDD) 211, a drive 212, and a communication device 215.

The CPU 201 functions as a processing device and a control device, and it controls the overall operation in the wireless communication apparatus 20 according to various programs. The CPU 201 may be a microprocessor. The ROM 202 stores programs to be used by the CPU 201, processing parameters and so on. The RAM 203 temporarily stores programs to be used in the execution of the CPU 201, parameters that vary in the execution and so on. The CPU 201, the ROM 202 and the RAM 203 are connected to one another through the host bus 204, which may be a CPU bus or the like.

The host bus 204 is connected to the external bus 206 such as a PCI (Peripheral Component Interconnect/Interface) bus via the bridge 205. The host bus 204, the bridge 205 and the external bus 206 are not necessarily separated from one another, and their functions may be implemented by one bus.

The input device 208 includes input means for a user to input information, such as a mouse, a keyboard, a touch panel, a button, a microphone, a switch or a lever, and an input control circuit for generating an input signal based on a user input and outputting it to the CPU 201, for example. A user of the wireless communication apparatus 20 manipulates the input device 208 to thereby input various kinds of data or instruct processing operations to the wireless communication apparatus 20.

The output device 210 includes a display device such as a CRT (Cathode Ray Tube) display device, an LCD (Liquid Crystal Display) device, an OLED (Organic Light Emitting Diode) device or a lamp. Also, the output device 210 includes an audio output device such as a speaker or a headphone, for example. The output device 210 outputs reproduced contents, for example. Specifically, the display device displays various kinds of information such as reproduced video data by texts or images. On the other hand, the audio output device converts reproduced audio data or the like into sound and outputs the sound.

The storage device 211 is a device for data storage that is configured as an example of a storage unit of the wireless communication apparatus 20 according to the present embodiment. The storage device 211 may include a storage medium, a recording device to record data in the storage medium, a reading device to read data from the storage medium, a deleting device to delete data recorded in the storage medium, or the like. The storage device 211 may be an HDD (Hard Disk Drive), for example. The storage unit 211 drives a hard disk and stores programs to be executed by the CPU 201 and various data.

The drive 212 is a reader/writer for a storage medium, and it may be incorporated into the wireless communication apparatus 20 or attached thereto externally. The drive 212 reads information recorded in a removable storage medium 24 such as a magnetic disk, an optical disk, a magneto-optical disk or a semiconductor memory which is attached thereto and outputs the information to the RAM 203. Furthermore, the drive 212 may also write information in the removable storage medium 24.

The communication device 215 is a communication interface configured by a communication device or the like to connect to a peripheral wireless communication apparatus 20, for example. The communication device 215 may be a communication device compatible with a wireless LAN (Local Area Network), a communication device compatible with LTE (Long Term Evolution), or a wire communication device that performs wired communication.

(Functional Configuration)

Figure 4:
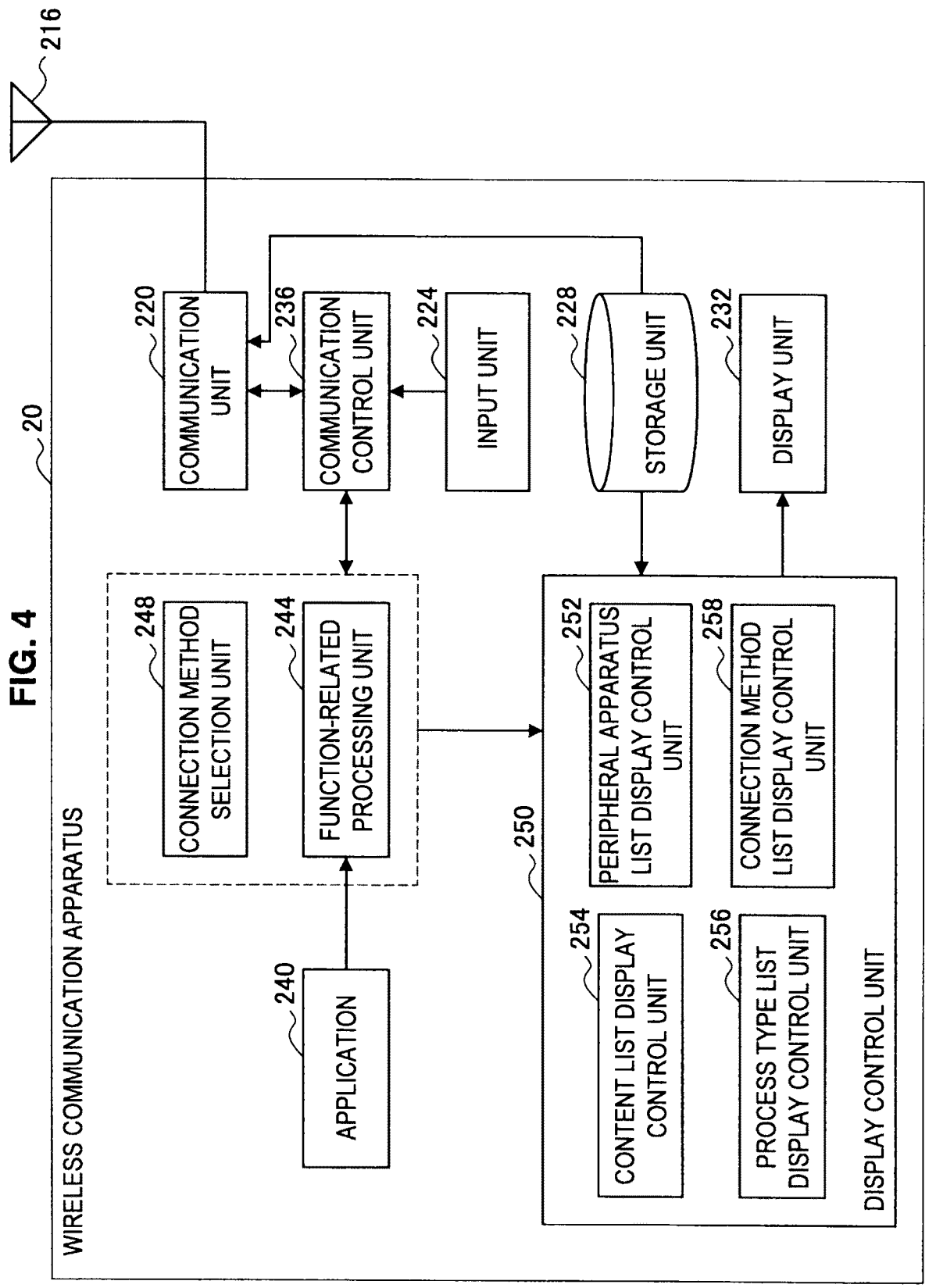
FIG. 4 is a functional block diagram showing a configuration of a wireless communication apparatus according to an embodiment of the present disclosure.

FIG. 4 is a functional block diagram showing a configuration of the wireless communication apparatus 20 according to an embodiment of the present disclosure. As shown in FIG. 4, the wireless communication apparatus 20 according to an embodiment of the present disclosure includes an antenna 216, a communication unit 220, an input unit 224, a storage unit 228, a display unit 232, a communication control unit 236, an application 240, a function-related processing unit 244, a connection method selection unit 248, and a display control unit 250.

The antenna 216 is an interface for transmitting/receiving a wireless signal to/from a peripheral wireless communication apparatus 20. Specifically, the antenna 216 converts an electrical signal supplied from the communication unit 220 into a wireless signal and transmits the same, or converts a wireless signal received from a peripheral wireless communication apparatus 20 into an electrical reception signal and supplies the same to the communication unit 220, for example.

The communication unit 220 performs generation of a transmission signal, decoding and analysis of a reception signal, and the like. For example, the communication unit 220 generates various control messages or data packets according to instructions from upper layers such as the communication control unit 236 and the application 240 and modulates the control messages or the data packets into frequency bands of carrier waves to thereby generate transmission signals. Furthermore, the communication unit 220 down-converts reception signals supplied from the antenna 216, and decodes various control messages or data packets.

The input unit 224 is a structure used by a user to perform an operation on the wireless communication apparatus 20. The input unit 224 may be a touch panel, a button, a switch, a lever, or a dial, for example. The input unit 224 may also be an acceleration sensor for detecting a gesture of a user.

The storage unit 228 is a storage medium for storing content data such as photograph data, music data, or the like. Such a storage unit 228 may be a storage medium such as a non-volatile memory, a magnetic disk, an optical disk, an MO (Magneto Optical) disk, or the like. As the non-volatile memory, an EEPROM (Electrically Erasable Programmable Read-Only Memory) and an EPROM (Erasable Programmable ROM) may be cited, for example. Also, as the magnetic disk, a hard disk, a discoid magnetic disk, and the like may be cited. Further, as the optical disk, a CD (Compact Disc), a DVD-R (Digital Versatile Disc Recordable), a BD (Blu-Ray Disc (registered trademark)), and the like may be cited.

The display unit 232 displays a display screen generated by the display control unit 250, such as a peripheral apparatus list, a content list, a process type list, and the like.

The communication control unit 236 controls communication of the communication unit 220 in entirety. For example, the communication control unit 236 performs operations such as determination of a frequency to be used, generation of a control message and issuance of a transmission command therefor, interpretation of a control message, connection process control, and the like. Additionally, in the case the wireless communication apparatus 20 can act both as a client and as a group owner, the control message may be notification information such as a beacon, a reception response for a beacon, a probe request defined in Wi-Fi Direct, a probe response, a service discovery query, and a service discovery response. The communication control unit 236 can discover a peripheral wireless communication apparatus 20 by controlling communication of a probe request, a probe response, a service discovery query and a service discovery response, that is, by controlling a search process for a peripheral wireless communication apparatus 20.

To describe in more detail, the communication control unit 236 discovers a peripheral wireless communication apparatus 20 by communication of the probe request and a probe response, and collects information regarding, for example, functions of the peripheral wireless communication apparatus 20 which has been discovered, types of contents that it can handle, and its compatible connection method. For example, the communication control unit 236 performs control of transmission of a service discovery query as a function confirmation request for inquiring about presence/absence of a function corresponding to the application 240 specified by the function-related processing unit 244. Also, in the case a service discovery query is received by the communication unit 220 from another wireless communication apparatus 20, the communication control unit 236 performs control of transmission of a service discovery response as a function confirmation response indicating presence/absence of a function indicated by the service discovery query.

As a concrete example, if the application 240 is an application for causing a peripheral wireless communication apparatus 20 to display photograph data, the function-related processing unit 244 specifies "photograph display" as the function corresponding to the application 240. In this case, the communication control unit 236 controls transmission of a service discovery query for inquiring about presence/absence of a "photograph display" function. On the other hand, if the service discovery query for inquiring about presence/absence of a "photograph display" function is received by the communication unit 220, the function-related processing unit 244 determines whether the application 240 has the "photograph display" function. Then, the communication control unit 236 controls transmission of a service discovery response indicating the determination result of the function-related processing unit 244.

Furthermore, if the application 240 is an application for providing photograph data for some kind of processing at a peripheral wireless communication apparatus 20, the function-related processing unit 244 specifies a function related to "photograph" as a function corresponding to the application 240. In this case, the communication control unit 236 controls transmission of a service discovery query for inquiring about presence/absence of the function related to "photograph." On the other hand, if the service discovery query for inquiring about presence/absence of a function related to "photograph" is received by the communication unit 220, the function-related processing unit 244 performs determination regarding the function, related to "photograph," of the application 240. Then, the communication control unit 236 controls transmission of a service discovery response indicating the determination result (for example, display, save, upload, and the like) of the function-related processing unit 244.

Additionally, in the embodiment of the present disclosure, public action frames are used as the service discovery query and the service discovery response. The public action frame is a type of an action frame, and is a frame defined and expanded by IEEE 802.11 k as a management frame that can be transmitted before connection of wireless communication apparatuses. Detailed structures of the service discovery query and the service discovery response described above will be described later with reference to FIGS. 5 and 6.

The application 240 is an arbitrary application that uses content data, as described above. For example, the application 240 may be an application for causing a peripheral wireless communication apparatus 20 to display photograph data, or an application for displaying photograph data supplied from a peripheral wireless communication apparatus 20, for example. In the embodiment of the present disclosure, start of this application 240 is a trigger for wireless connection to a peripheral wireless communication apparatus 20. Additionally, the application 240 is started by a selection operation or an execution operation of an application by a user, for example.

As described above, the function-related processing unit 244 specifies a function corresponding to the application 240, or determines whether or not the application 240 corresponds to a function indicated by a service discovery query which has been received, for example. Also, the function-related processing unit 244 selects a process to be performed by a wireless communication apparatus 20 that is a connection destination. A process selected by the function-related processing unit 244 or a process selected by a user is notified by the communication control unit 236 to the wireless communication apparatus 20 that is the connection destination.

The connection method selection unit 248 uses a result of a search process for a peripheral wireless communication apparatus 20, and selects a connection method to the peripheral wireless communication apparatus 20 or candidates for the connection method. The connection method may be WPS, or, if a peripheral wireless communication apparatus 20 to which connection was previously performed is the connection destination, it may be a method that uses previous setup information. The communication control unit 236 controls a process of connection to a peripheral wireless communication apparatus 20 according to the connection method selected by the connection method selection unit 248 or a connection method selected by the user from the candidates for the connection method.

As shown in FIG. 4, the display control unit 250 includes functions of a peripheral apparatus list display control unit 252, a content list display control unit 254, a process type list display control unit 256, and a connection method list display control unit 258.

The peripheral apparatus list display control unit 252 controls display of peripheral wireless communication apparatuses 20 discovered by the search process by the communication control unit 236. Here, the peripheral apparatus list display control unit 252 may also cause the display unit 232 to display only the peripheral wireless communication apparatuses 20, having a function corresponding to the application 240, which have been discovered by communication of the service discovery query and the service discovery response. The user can select a connection destination from this peripheral apparatus list.

Additionally, the peripheral apparatus list display control unit 252 may cause the display unit 232 to display peripheral wireless communication apparatuses 20 which have been discovered in various formats such as icons, character strings, or the like. Also, the peripheral apparatus list display control unit 252 may change the display on the display unit 232 of the peripheral wireless communication apparatuses 20 depending on whether or not an operation on the peripheral wireless communication apparatuses 20 is necessary for the connection process.

For example, if a peripheral wireless communication apparatus 20 is in a WPS mode, which is a state where WPS is temporarily automatically accepted, that is, a state where WPS is performed at all times, an operation on the peripheral wireless communication apparatus 20 is not necessary. In this case, the peripheral apparatus list display control unit 252 may change the display of the peripheral wireless communication apparatus 20 by changing the colour, the brightness, the size, or the like. According to this configuration, the user may perceive whether operation on a peripheral wireless communication apparatus 20 is necessary or not according to the display mode of the peripheral wireless communication apparatus 20.

The content list display control unit 254 controls display of a content list of icons and thumbnails of pieces of content data stored in the storage unit 228. The user can select content data from this content list. Additionally, concrete examples of display screens including the content list and peripheral apparatus list will be described later with reference to FIGS. 8 and 10.

If the peripheral wireless communication apparatus 20 that is the connection destination has a plurality of processing functions corresponding to the application 240, the process type list display control unit 256 controls display of a process type list showing the plurality of processing functions. For example, if the application 240 is an application for providing photograph data and the wireless communication apparatus 20 that is the connection destination has processing functions such as display, save, upload, and the like of photograph data, the process type list display control unit 256 causes the display unit 232 to display a process type list showing display, save, and upload. The user can select a process to be performed by the wireless communication apparatus 20 that is the connection destination from this process type list.

The connection method list display control unit 258 controls display of a connection method list showing candidates for a connection method selected by the connection method selection unit 248. The user can select a connection method to the peripheral wireless communication apparatus 20 from this connection method list.

(Frame Structure)

Now, the structures of the service discovery query and the service discovery response used for exchanging information related to the application 240 will be described with reference to FIGS. 5 and 6.

Figure 5:
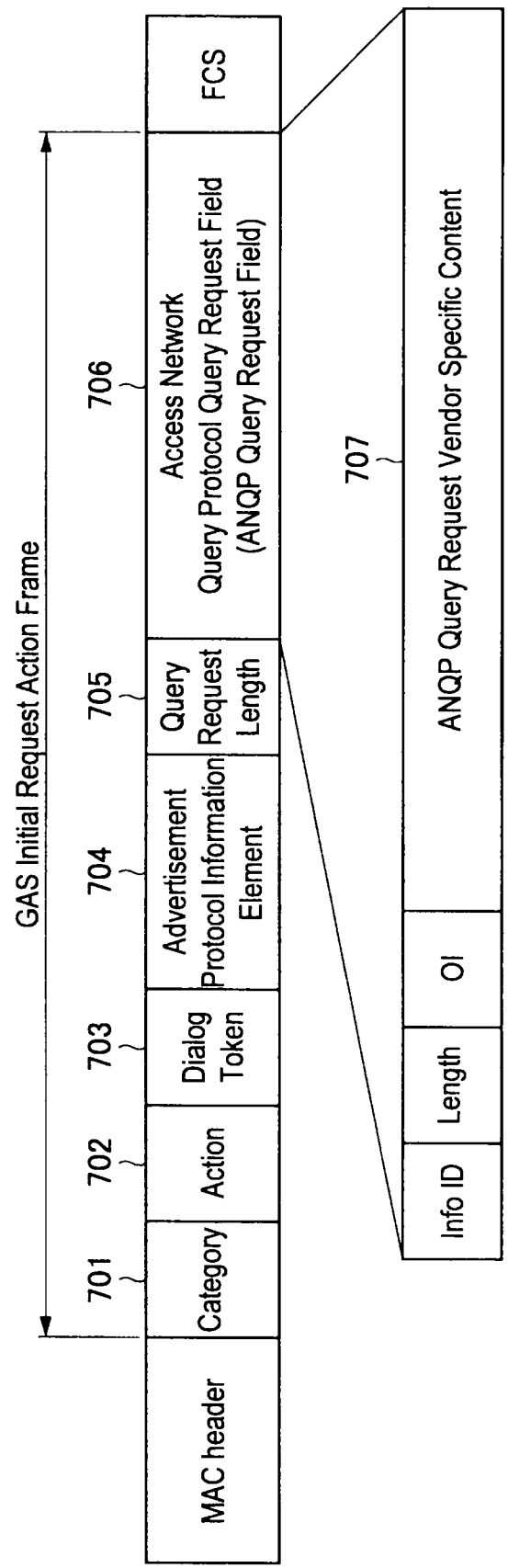
FIG. 5 is an explanatory diagram showing a structure of a service discovery query.

FIG. 5 is an explanatory diagram showing a structure of the service discovery query. As shown in FIG. 5, the service discovery query is structured from a MAC header, a GAS initial request action frame, and an FCS.

The GAS initial request action frame is defined as a frame that is transmitted to request another wireless communication apparatus for wireless communication, and includes a category field 701, an action field 702, a dialog token field 703, an advertisement protocol information element field 704, a query request length field 705, and an ANQP query request field 706.

Information specifying a public action frame is stored in the category field 701 as the category of a management frame defined in IEEE 802.11. That is, the category field 701 indicates that the service discovery query is a public action frame.

Information specifying a GAS initial request action frame is stored in the action field 702 as the action type of the public action frame. That is, the action field 702 indicates that the service discovery query is a GAS initial request action frame.

Information for uniquely identifying the service discovery query is stored in the dialog token field 703. Identification information, destination information, and response request information are stored in this dialog token field 703, for example.

Information indicating an ANQP (Access Network Query Protocol) is stored in the advertisement protocol information element field 704.

Information indicating the length of the ANQP query request field 706 is stored in the query request length field 705.

Information indicating the service protocol type requested by the service discovery query is stored in the ANQP query request field 706. To be specific, the ANQP query request field 706 is structured from an information ID (Info ID) field, a length field, an OI field, and an ANQP query request vendor specific content field 707.

Information for inquiring about presence/absence of a function corresponding to the application 240, and the like are stored in this ANQP query request vendor specific content field 707.

Figure 6:
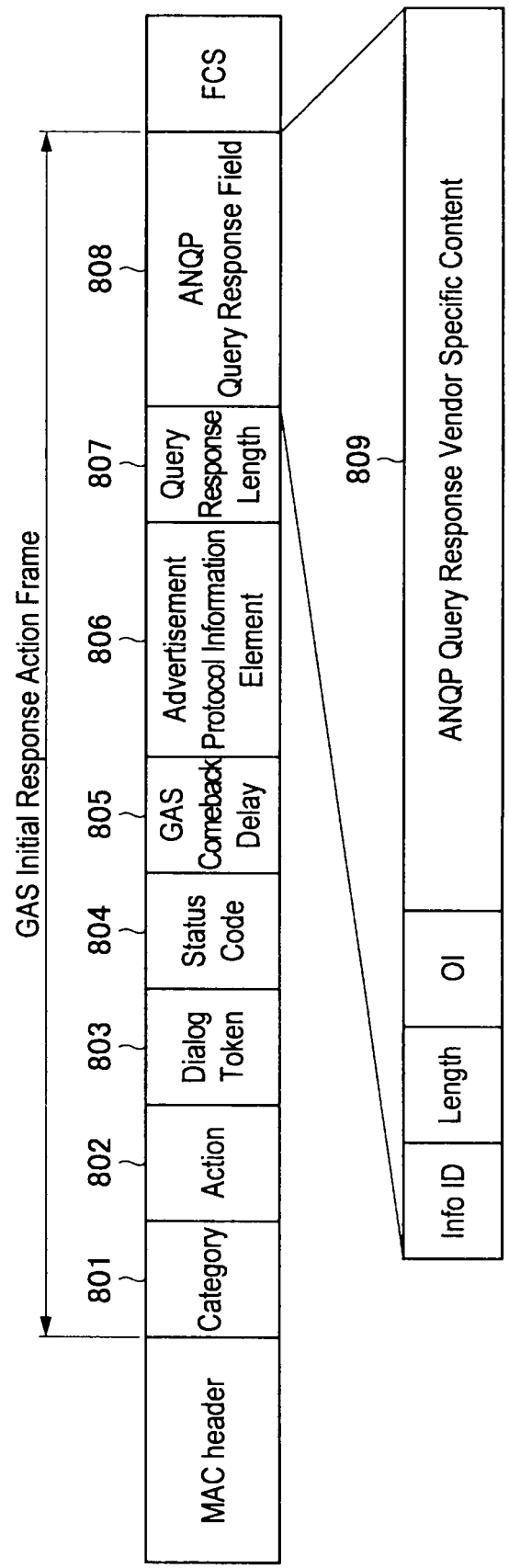
FIG. 6 is an explanatory diagram showing a structure of a service discovery response.

FIG. 6 is an explanatory diagram showing a structure of the service discovery response. As shown in FIG. 6, the service discovery response is structured from a MAC header, a GAS initial response action frame, and an FCS.

The GAS initial response action frame is defined as a frame that is transmitted to respond to a request for wireless communication from another wireless communication apparatus, and includes a category field 801, an action field 802, a dialog token field 803, a status code field 804, a GAS comeback delay field 805, an advertisement protocol information element field 806, a query response length field 807, and an ANQP query response field 808.

Same type of information stored in the category field 701 is stored in the category field 801. Information specifying a GAS initial response action frame is stored in the action field 802 as the action type of the public action frame. That is, the action field 802 indicates that the service discovery response is a GAS initial response action frame.

Information for uniquely identifying the service discovery response is stored in the dialog token field 803. Identification information, destination information, and response information are stored in this dialog token field 803, for example.

Information indicating the status defined in IEEE 802.11 u is stored in the status code field 804.

Information indicating the delay time of the service discovery response is stored in the GAS comeback delay field 805.

Same type of information stored in the advertisement protocol information element field 704 is stored in the advertisement protocol information element field 806.

Information indicating the length of the ANQP query response field 808 is stored in the query response length field 807.

Information indicating the service protocol type requested by the service discovery response is stored in the ANQP query response field 808. To be specific, the ANQP query response field 808 is structured from an information ID field, a length field, an OI field, and an ANQP query response vendor specific content field 809.

Information indicating whether or not the application 240 includes a function that is the inquiry target of the service discovery query, and the like are stored in this ANQP query response vendor specific content field 809.

3. Operation of Wireless Communication Apparatus

In the foregoing, a configuration of the wireless communication apparatus 20 according to the embodiment of the present disclosure has been described. Next, an operation of the wireless communication apparatus 20 according to the embodiment of the present disclosure will be described.

3-1. First Operation Example

Figure 7:
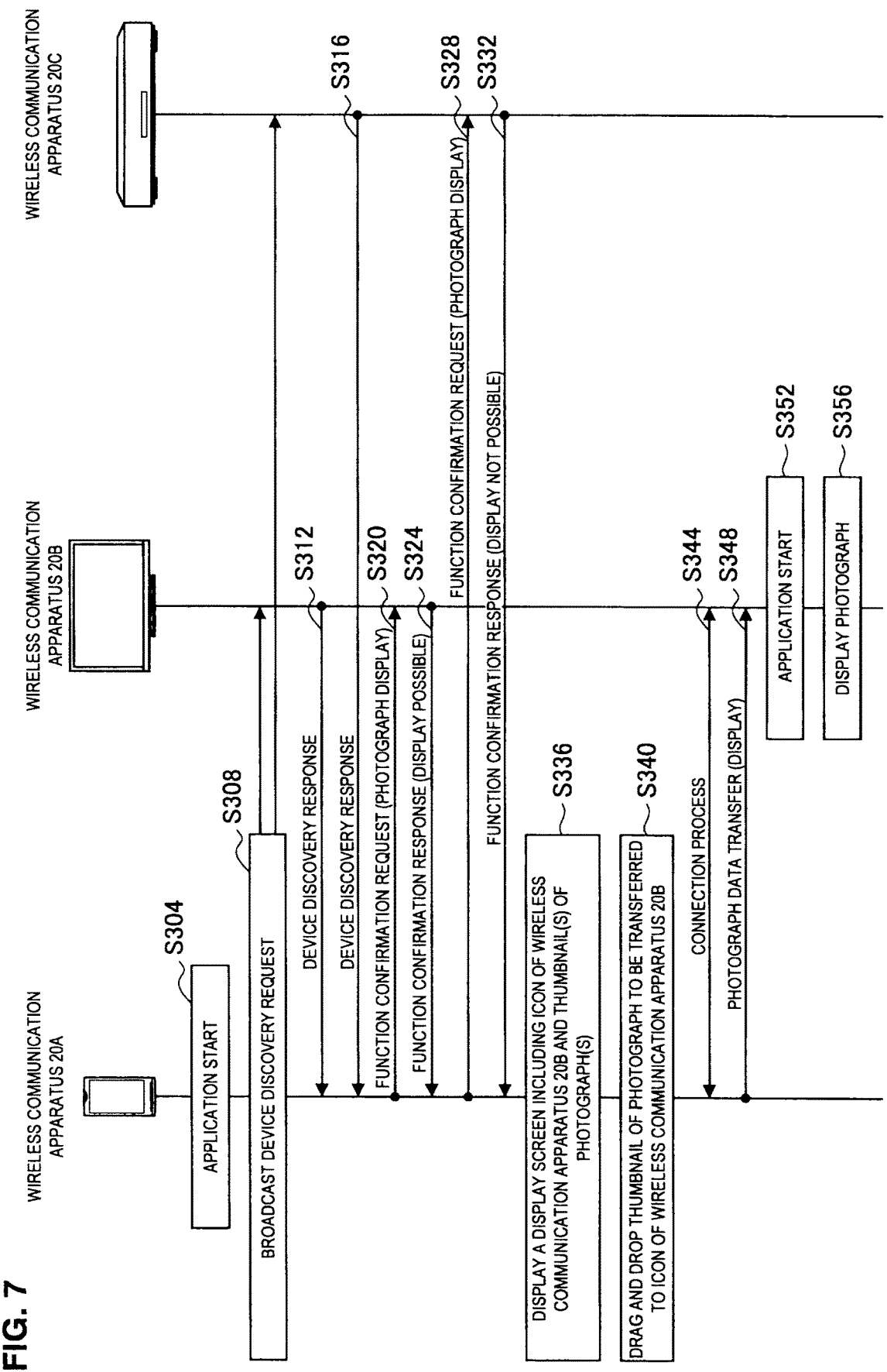
FIG. 7 is a sequence diagram showing a first operation example according to an embodiment of the present disclosure.

FIG. 7 is a sequence diagram showing a first operation example according to the embodiment of the present disclosure. As shown in FIG. 7, in an environment where wireless communication apparatuses 20B and 20C are present in the periphery of a wireless communication apparatus 20A, when the application 240 is started by a selection operation or an execution operation of an application by a user (S304), the wireless communication apparatus 20A starts device discovery defined in Wi-Fi Direct.

Specifically, the communication control unit 236 of the wireless communication apparatus 20A controls broadcast of a probe request as a device discovery request (S308). Then, the wireless communication apparatus 20A receives probe responses transmitted as device discovery responses in response to the probe request from the wireless communication apparatuses 20B and 20C, and thereby discovers the wireless communication apparatuses 20B and 20C (S312, S316).

Then, the wireless communication apparatus 20A performs service discovery defined in Wi-Fi Direct with respect to each of the discovered wireless communication apparatuses 20B and 20C. Specifically, the communication control unit 236 of the wireless communication apparatus 20A transmits, as a function confirmation request for inquiring about presence/absence of a function corresponding to the application 240 specified by the function-related processing unit 244, a service discovery query to the wireless communication apparatus 20B (S320). Here, the function corresponding to the application 240 is assumed to be "photograph display." In this case, since the wireless communication apparatus 20B has a "photograph display" function, it transmits, as a function confirmation response indicating that "photograph display" is possible, a service discovery response to the wireless communication apparatus 20A (S324).

In the same manner, the communication control unit 236 of the wireless communication apparatus 20A transmits a service discovery query inquiring about presence/absence of the "photograph display" function to the wireless communication apparatus 20C (S328). In response to this, since it does not have the "photograph display" function, the wireless communication apparatus 20C transmits a service discovery response indicating that "photograph display" is not possible to the wireless communication apparatus 20A (S332).

With identification of the wireless communication apparatuses 20B and 20C by the device discovery responses in S312 and S316 and reception of the function confirmation responses from the wireless communication apparatuses 20B and 20C in S324 and S332 as a trigger (no user operation), the display control unit 250 of the wireless communication apparatus 20A causes the display unit 232 to display a display screen including a peripheral apparatus list including an icon of the wireless communication apparatus 20B having the "photograph display" function and a content list including thumbnails of photographs (S336).

Figure 8:
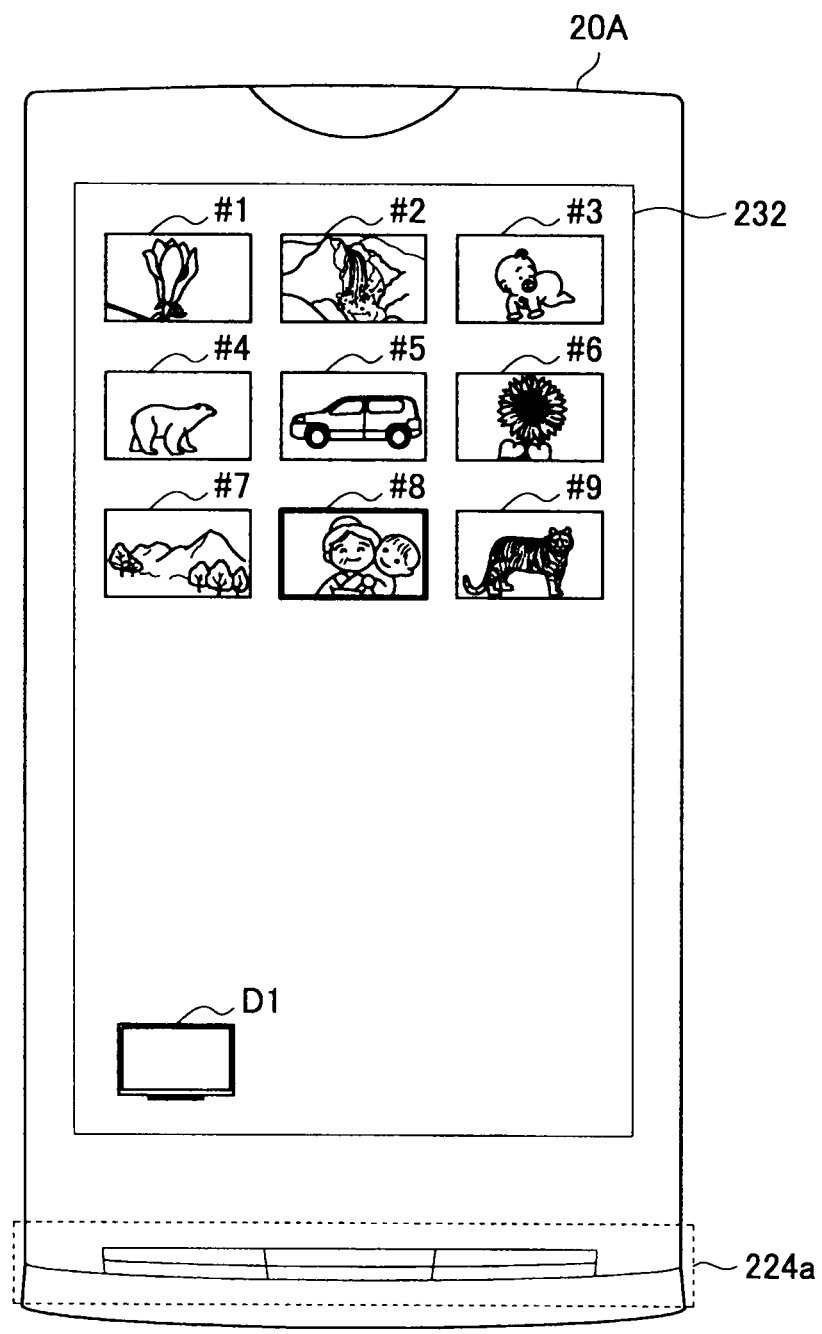
FIG. 8 is an explanatory diagram showing a concrete example of a display screen displayed on a display unit.

FIG. 8 is an explanatory diagram showing a concrete example of the display screen displayed on the display unit 232. As shown in FIG. 8, the display screen displayed on the display unit 232 includes thumbnails #1 to #9 of a plurality of photographs and an icon D1 of the wireless communication apparatus 20B. Additionally, an example is shown in FIG. 8 where the content list is made up of thumbnails corresponding to respective photographs, but the content list may be structured from the file names of the respective photographs. Likewise, although an example is shown in FIG. 8 where the peripheral apparatus list is made up of the icon of the wireless communication apparatus 20B, which is the connection destination, the peripheral apparatus list may be made up of the model number, the name or the like of the wireless communication apparatus 20B.

A user selects on such a display screen a display destination of a photograph and the thumbnail of a photograph desired to be displayed at the display destination (S340). For example, if the user wants to display a photograph #8 at the wireless communication apparatus 20B, he/she may select the photograph #8 and the wireless communication apparatus 20B by dragging and dropping the thumbnail #8 of the photograph #8 in the icon D1 of the wireless communication apparatus 20B. Alternatively, the user may select a photograph and a display destination by a tap on a thumbnail of a photograph and the icon of a display destination, or by an operation on a button group 224a forming the input unit 224, for example.

When a photograph and a display destination (wireless communication apparatus 20B) are selected by the user, the wireless communication apparatus 20A and the wireless communication apparatus 20B start a connection process by WPS (S344). The wireless communication apparatus 20B here may operate in a WPS mode to simplify user operation. Or, the wireless communication apparatus 20A and the wireless communication apparatus 20B may start the connection process when a photograph and a display destination are selected by the user (S340) and a WPS button provided on the main body of the wireless communication apparatus 20B or on a remote control is pressed down.

Additionally, at the time of the connection process of S344, the connection method list display control unit 258 of the wireless communication apparatus 20A may display a connection method list showing candidates for the connection method on the display unit 232. Then, the wireless communication apparatus 20A and the wireless communication apparatus 20B may perform the connection process according to a connection method selected by the user from this connection method list.

Then, when the connection process is complete, the wireless communication apparatus 20A transfers the photograph data selected in S340 to the wireless communication apparatus 20B (S348). The communication control unit 236 of the wireless communication apparatus 20A notifies here to the wireless communication apparatus 20B of a process type "display" together with transmitting the photograph data. Additionally, in the first operation example, the process type at the connection destination is limited to "display," and thus selection of a process type by the user is not necessary.

When the photograph data and the notification regarding the process type are received from the wireless communication apparatus 20A, the wireless communication apparatus 20B starts the application (S352), and displays the photograph data received from the wireless communication apparatus 20A according to the notification from the wireless communication apparatus 20A (S356).

As has been described above, according to the first operation example, the wireless communication apparatus 20 starts a search process such as device discovery or service discovery by the start of the application 240, and displays pieces of content data to be transferred and candidates for the connection destination. Accordingly, the user can select content data to be transferred and the connection destination following the guide on the display screen without being conscious of complex setup operations for the wireless connection.

Here, if contents of processing at the wireless communication apparatus 20 which is the connection destination are decided, the wireless communication apparatus 20 notifies the wireless communication apparatus 20 which is the connection destination of the contents of processing. Thus, if content data to be transferred and the connection destination are selected, the connection process, transmission of the content data, and processing of the content data at the connection destination can be realized.

As described, according to the first operation example, many operations including connection setup that were necessary, according to other methods, until processing of content data at a connection destination can be concealed from the user, and thus the user can achieve processing of content data at a connection destination with fewer and intuitive operations.

3-2. Second Operation Example

Figure 9:
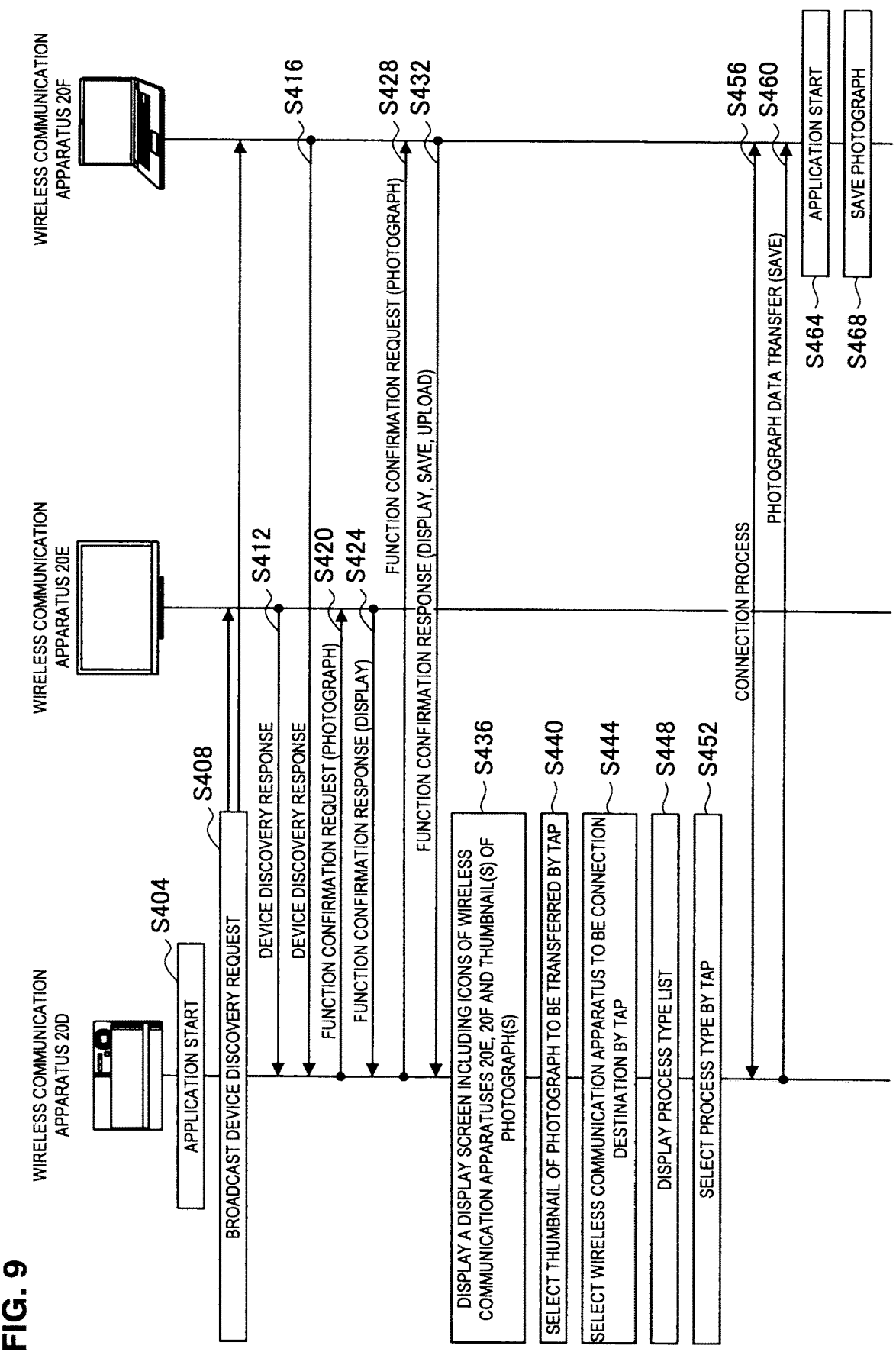
FIG. 9 is a sequence diagram showing a second operation example according to an embodiment of the present disclosure.

FIG. 9 is a sequence diagram showing a second operation example according to the embodiment of the present disclosure. As shown in FIG. 9, in an environment where wireless communication apparatuses 20E and 20F are present in the periphery of a wireless communication apparatus 20D, when the application 240 is started by a selection operation or an execution operation of an application by a user (S404), the wireless communication apparatus 20D starts device discovery defined in Wi-Fi Direct. The wireless communication apparatus 20D discovers the wireless communication apparatuses 20E and 20F by this device discovery (S412, S416).

Then, the wireless communication apparatus 20D performs service discovery defined in Wi-Fi Direct with respect to each of the discovered wireless communication apparatuses 20E and 20F. Specifically, the communication control unit 236 of the wireless communication apparatus 20D transmits a service discovery query inquiring about processing that can be performed on a photograph to the wireless communication apparatus 20E (S420). In response to this, since it has a display function for a photograph, the wireless communication apparatus 20E transmits a service discovery response indicating that "display" is possible to the wireless communication apparatus 20D (S424).

In the same manner, the communication control unit 236 of the wireless communication apparatus 20D transmits a service discovery query inquiring about processing that can be performed on a photograph to the wireless communication apparatus 20F (S428). In response to this, since it has a display function, a save function and an upload function for a photograph, the wireless communication apparatus 20F transmits a service discovery response indicating that "display," "save" and "upload" are possible to the wireless communication apparatus 20D (S432).

With identification of the wireless communication apparatuses 20E and 20F by the device discovery responses in S412 and S416 and reception of the function confirmation responses from the wireless communication apparatuses 20E and 20F in S424 and S432 as a trigger, the display control unit 250 of the wireless communication apparatus 20D causes the display unit 232 to display a display screen including a peripheral apparatus list including icons of the wireless communication apparatuses 20E and 20F that are capable of performing certain processing on a photograph and a content list including thumbnails of photographs (S436).

A user selects, by a tap, on such a display screen a thumbnail of a photograph to be transferred (S440), and selects, by a tap, a wireless communication apparatus 20 that is to be a connection destination (S444). Here, a case is assumed where the user has selected the wireless communication apparatus 20F as the connection destination. In this case, the process type list display control unit 256 of the wireless communication apparatus 20D causes the display unit 232 to display, as shown in FIG. 10, a process type list showing processes that the wireless communication apparatus 20F is capable of performing on a photograph (S448).

Figure 10:
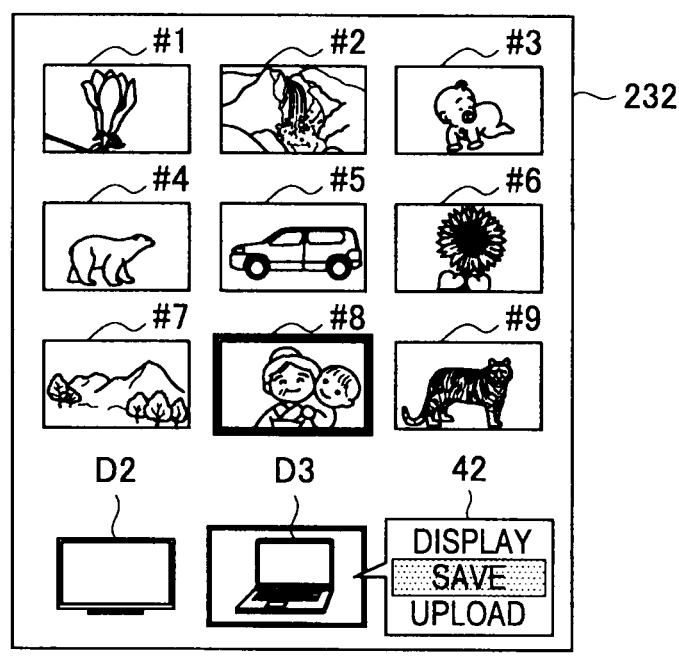
FIG. 10 is an explanatory diagram showing a concrete example of a display screen displayed on a display unit.

FIG. 10 is an explanatory diagram showing a concrete example of the display screen displayed on the display unit 232. As shown in FIG. 10, the display screen displayed on the display unit 232 includes thumbnails #1 to #9 of a plurality of photographs, an icon D2 of the wireless communication apparatus 20E, an icon D3 of the wireless communication apparatus 20F, and a process type list 42. The process type list 42 includes display of "display," "save," and "upload."

A user selects by a tap a process type to be performed by the wireless communication apparatus 20F from the process type list 42 on such a display screen (S452). When a process type is selected by the user, the wireless communication apparatus 20D and the wireless communication apparatus 20F start a connection process (S456).

Then, when the connection process is complete, the wireless communication apparatus 20D transfers the photograph data selected in S440 to the wireless communication apparatus 20F (S456). The communication control unit 236 of the wireless communication apparatus 20D notifies here to the wireless communication apparatus 20F "save," for example, as the process type selected in 5452, together with transmitting the photograph data.

When the photograph data and the notification regarding the process type are received from the wireless communication apparatus 20D, the wireless communication apparatus 20F starts the application (S464), and displays the photograph data received from the wireless communication apparatus 20D according to the notification from the wireless communication apparatus 20D (S468).

As described, according to the second operation example, a search process such as device discovery or service discovery is started by the start of the application 240, and a connection process is started by the selection of three elements, namely the content data to be transferred, the connection destination, and the process type for the content data. Accordingly, the user can easily connect a desired plurality of wireless communication apparatuses 20 without being conscious of complex setup operations for the wireless connection.

3-3. Third Operation Example

Now, in the second operation example, an example has been described where a connection process is started by the selection of three elements, namely the content data to be transferred, the connection destination, and the process type for the content data, but a certain element may be selected after the start of the connection process. In the following, a third operation example according to which the process type for content data is selected after the start of the connection process will be described with reference to FIG. 11.

Figure 11:
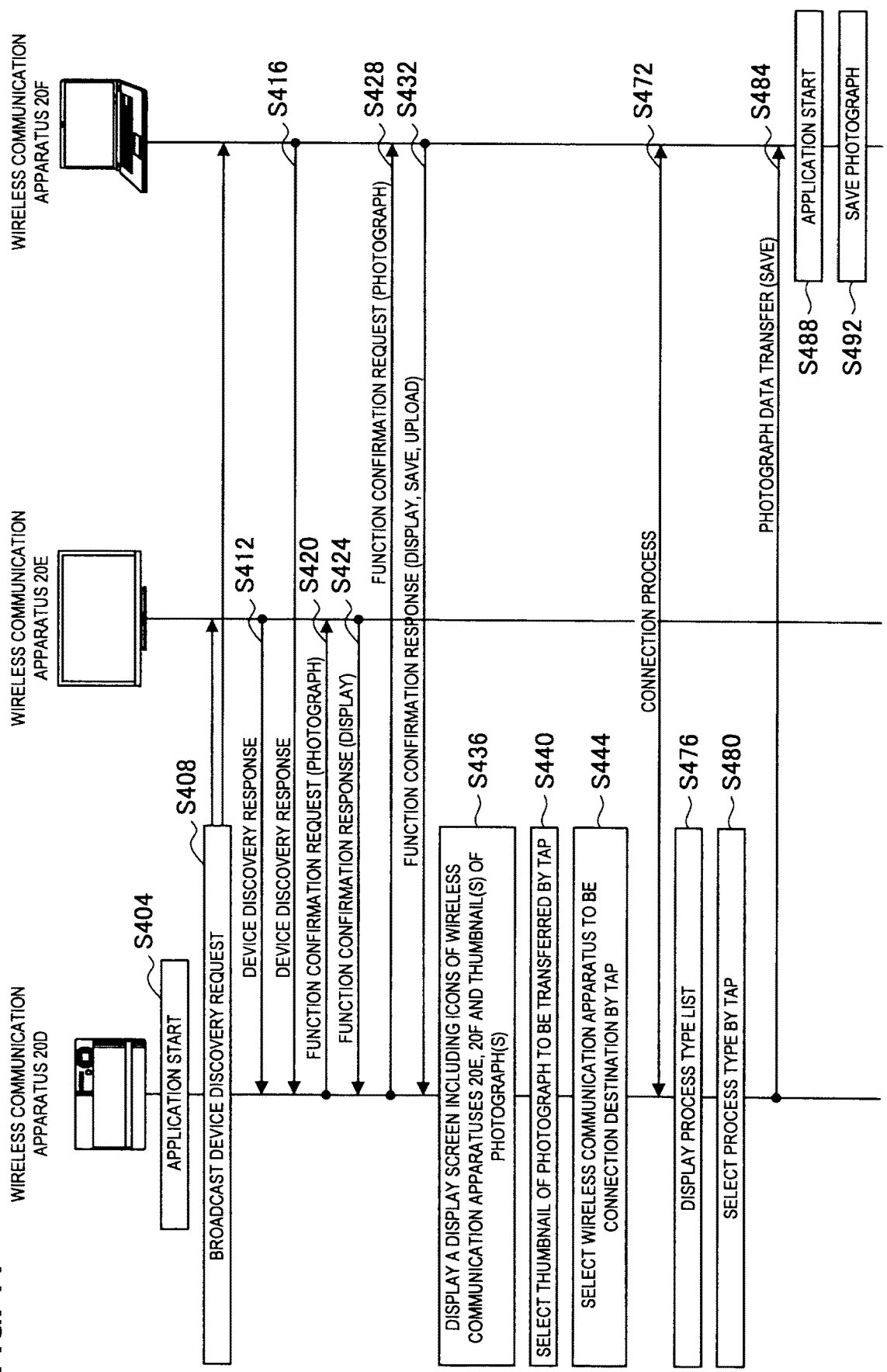
FIG. 11 is a sequence diagram showing a third operation example according to an embodiment of the present disclosure.

FIG. 11 is a sequence diagram showing a third operation example according to the embodiment of the present disclosure. The processes of S404 to 5444 of the third operation example are common with the second operation example, and detailed explanation thereof will be omitted.

When a photograph to be transferred and a wireless communication apparatus 20F as the connection destination are selected by the user (S440, S444), the wireless communication apparatus 20D starts a connection process with respect to the wireless communication apparatus 20F (S472).

Next, the process type list display control unit 256 of the wireless communication apparatus 20D causes the display unit 232 to display, as shown in FIG. 10, a process type list showing processing that the wireless communication apparatus 20F is capable of performing on a photograph (S476). The user selects by a tap, from such a process type list 42, a process type to be performed by the wireless communication apparatus 20F (S480).

Then, when the connection process is complete, the wireless communication apparatus 20D transfers the photograph data selected in S440 to the wireless communication apparatus 20F (S484). The communication control unit 236 of the wireless communication apparatus 20D notifies here to the wireless communication apparatus 20F of a process type "save" selected in S480, for example, together with transmitting the photograph data.

When the photograph data and the notification regarding the process type are received from the wireless communication apparatus 20D, the wireless communication apparatus 20F starts the application (S488), and saves the photograph data received from the wireless communication apparatus 20D according to the notification from the wireless communication apparatus 20D (S492).

As described above, according to the third operation example, the user selects the process type for content data during execution of the connection process. Accordingly, according to the third operation example, overall processing time can be reduced.

Additionally, an example has been described above where the wireless communication apparatus 20 automatically starts device discovery in response to start of the application 240, but the wireless communication apparatus 20 may start the device discovery after the user performs a confirmation operation.

Figure 12:
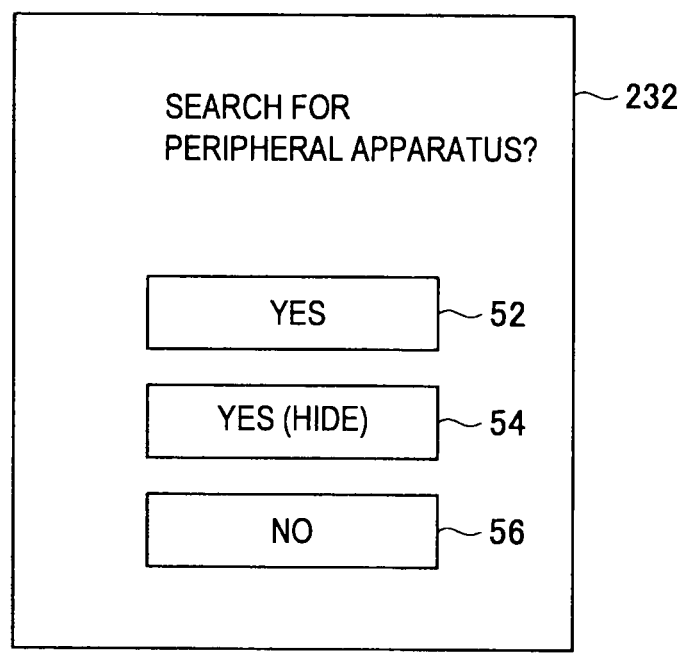
FIG. 12 is an explanatory diagram showing a concrete example of a display screen displayed on a display unit.

For example, the display control unit 250 of the wireless communication apparatus 20 may display a confirmation screen shown in FIG. 12 in a case the application 240 is started, and may start the device discovery after a confirmation operation is performed by the user on the confirmation screen. To be specific, the confirmation screen shown in FIG. 12 includes a button 52, which is a display of "YES," a button 54, which is a display of "YES (HIDE)," and a button 56, which is a display of "NO."

The wireless communication apparatus 20 may start device discovery in the case the button 52 is selected on the confirmation screen, and do not have to perform device discovery in the case the button 56 is selected. Also, in the case the button 54 is selected, the wireless communication apparatus 20 may start device discovery, and may hide this confirmation screen at later times.

4. Conclusion

As described above, the wireless communication apparatus 20 according to the embodiment of the present disclosure starts a search process such as device discovery or service discovery by the start of the application 240, and displays pieces of content data to be transferred and candidates for connection destination. Then, when a connection destination and content data are selected by the user, the wireless communication apparatus 20 starts a connection process to the selected connection destination, and when the connection process is complete, starts transmission of the content data. Here, the user can select the content data to be transferred and the connection destination following the guide on the display screen without being conscious of complex setup operations for the wireless connection. That is, according to the embodiment of the present disclosure, many operations including connection setup that were necessary, according to other methods, until transmission of content data to a connection destination can be concealed from the user, and thus the user can achieve transmission of content data to a connection destination with fewer and intuitive operations.

Furthermore, if the process type for the content data at the connection destination is decided, the wireless communication apparatus 20 can automatically realize up to the processing of the content data at the connection destination by notifying the connection destination of this process type.

It should be understood by those skilled in the art that various modifications, combinations, sub-combinations and alterations may occur depending on design requirements and other factors insofar as they are within the scope of the appended claims or the equivalents thereof.

For example, the steps of the processing of the wireless communication apparatus 20 according to the present specification do not necessarily have to be processed chronologically according to the order described as the sequence diagram. For example, the steps of the processing of the wireless communication apparatus 20 can also be processed in an order different from that described as the sequence diagram or may be processed in parallel.

Furthermore, a computer program for causing hardware, such as the CPU 201, the ROM 202, or the RAM 203, embedded in the wireless communication apparatus 20 to realize an equivalent function as each element of the wireless communication apparatus 20 described above can also be created. Furthermore, a storage medium storing the computer program is also provided.

The present disclosure contains subject matter related to that disclosed in Japanese Priority Patent Application JP 2011-038158 filed in the Japan Patent Office on Feb. 24, 2011, the entire content of which is hereby incorporated by reference.

What is claimed is:

1. A wireless communication apparatus, comprising:
at least one processor configured to:
control start of an application associated with display of a thumbnail of content data on the wireless communication apparatus, wherein the content data is stored in the wireless communication apparatus;
control a search process, to discover a plurality of peripheral wireless communication apparatuses, based on the start of the application;
control transmission of an inquiry, based on the search process, to the discovered plurality of peripheral wireless communication apparatuses, about presence or absence of a function, wherein the function corresponds to the content data and the application started in the wireless communication apparatus;
control a display screen to display a selectable list of the discovered plurality of peripheral wireless communication apparatuses having the function, wherein
the selectable list includes a plurality of icons of the discovered plurality of peripheral wireless communication apparatuses, and
the display of the selectable list is based on a response, from the discovered plurality of peripheral wireless communication apparatuses, that indicates the presence of the function;
control selection of the content data by a first tap operation on the thumbnail of the content data displayed on the display screen;
control selection of a first peripheral wireless communication apparatus from the selectable list of the discovered plurality of peripheral wireless communication apparatuses by a second tap operation on a first icon of the first peripheral wireless communication apparatus displayed on the display screen;
control the display screen, to concurrently display the thumbnail of the content data, a process type list of the selected first peripheral wireless communication apparatus, and the plurality of icons of the discovered plurality of peripheral wireless communication apparatuses, based on the selection of the first peripheral wireless communication apparatus, wherein
the process type list includes a plurality of processes, and
the plurality of processes is executable by the selected first peripheral wireless communication apparatus;
select a first process of the plurality of processes by a third tap operation, wherein the first process is associated with the function;
control execution of a connection process, to connect the wireless communication apparatus to the selected first peripheral wireless communication apparatus, based on the selection of the first process; and
control transmission of the content data, from the wireless communication apparatus to the selected first peripheral wireless communication apparatus, based on the execution of the connection process, the first tap operation, and the second tap operation.

2. The wireless communication apparatus according to claim 1, wherein the at least one processor is further configured to notify the selection of the first process to the selected first peripheral wireless communication apparatus.

3. A wireless communication method, comprising:
in a wireless communication apparatus:
controlling start of an application associated with display of a thumbnail of content data on the wireless communication apparatus, wherein the content data is stored in the wireless communication apparatus;
controlling a search process, for discovering a plurality of peripheral wireless communication apparatuses, based on the start of the application;
controlling transmission of an inquiry, based on the search process, to the discovered plurality of peripheral wireless communication apparatuses, about presence or absence of a function, wherein the function corresponds to the content data and the application started in the wireless communication apparatus;
controlling a display screen to display a selectable list of the discovered plurality of peripheral wireless communication apparatuses having the function, wherein
the selectable list includes a plurality of icons of the discovered plurality of peripheral wireless communication apparatuses, and
the display of the selectable list is based on a response, from the discovered plurality of peripheral wireless communication apparatuses, that indicates the presence of the function;
controlling selection of the content data by a first tap operation on the thumbnail of the content data displayed on the display screen;
controlling selection of a first peripheral wireless communication apparatus from the selectable list of the discovered plurality of peripheral wireless communication apparatuses by a second tap operation on a first icon of the first peripheral wireless communication apparatus displayed on the display screen;
controlling the display screen, to concurrently display the thumbnail of the content data, a process type list of the selected first peripheral wireless communication apparatus, and the plurality of icons of the discovered plurality of peripheral wireless communication apparatuses, based on the selection of the first peripheral wireless communication apparatus, wherein
the process type list includes a plurality of processes, and
the plurality of processes is executable by the selected first peripheral wireless communication apparatus;
selecting a specific process of the plurality of processes by a third tap operation, wherein the specific process is associated with the function;
controlling execution of a connection process, to connect the wireless communication apparatus to the selected first peripheral wireless communication apparatus, based on the selection of the specific process; and
controlling transmission of the content data, from the wireless communication apparatus to the selected first peripheral wireless communication apparatus, based on the execution of the connection process, the first tap operation, and the second tap operation.

4. A non-transitory computer-readable medium having stored thereon computer-executable instructions which, when executed by a wireless communication apparatus, cause the wireless communication apparatus to execute operations, the operations comprising:
controlling start of an application associated with display of a thumbnail of content data on the wireless communication apparatus, wherein the content data is stored in the wireless communication apparatus;
controlling a search process, for discovering a plurality of peripheral wireless communication apparatuses, based on the start of the application;
controlling transmission of an inquiry, based on the search process, to the discovered plurality of peripheral wireless communication apparatuses, about presence or absence of a function, wherein the function corresponds to the content data and the application started in the wireless communication apparatus;
controlling a display screen to display a selectable list of the discovered plurality of peripheral wireless communication apparatuses having the function, wherein
the selectable list includes a plurality of icons of the discovered plurality of peripheral wireless communication apparatuses, and
the display of the selectable list is based on a response, from the discovered plurality of peripheral wireless communication apparatuses, that indicates the presence of the function;
controlling selection of the content data by a first tap operation on the thumbnail of the content data displayed on the display screen;
controlling selection of a first peripheral wireless communication apparatus from the selectable list of the discovered plurality of one peripheral wireless communication apparatuses by a second tap operation on a first icon of the first peripheral wireless communication apparatus displayed on the display screen;
controlling the display screen, to concurrently display the thumbnail of the content data, a process type list of the selected first peripheral wireless communication apparatus, and the plurality of icons of the discovered plurality of peripheral wireless communication apparatuses, based on the selection of the first peripheral wireless communication apparatus, wherein
the process type list includes a plurality of processes, and
the plurality of processes is executable by the selected first peripheral wireless communication apparatus;
selecting a specific process of the plurality of processes by a third tap operation, wherein the specific process is associated with the function;
controlling execution of a connection process, to connect the wireless communication apparatus to the selected first peripheral wireless communication apparatus, based on the selection of the specific process; and
controlling transmission of the content data, from the wireless communication apparatus to the selected first peripheral wireless communication apparatus, based on the execution of the connection process, the first tap operation and the second tap operation.

5. A wireless communication system, comprising:
a first plurality of wireless communication apparatuses; and a second wireless communication apparatus comprising at least one processor, wherein the at least one processor is configured to:
  control start of an application associated with display of a thumbnail of content data on the second wireless communication apparatus, wherein the content data is stored in the second wireless communication apparatus;
  control a search process, to discover the first plurality of wireless communication apparatuses, based on the start of the application;
  control transmission of an inquiry, based on the search process, to the first plurality of wireless communication apparatuses, about presence or absence of a function, wherein the function corresponds to the content data and the application started in the second wireless communication apparatus;
  control a display screen to display a selectable list of the discovered first plurality of wireless communication apparatuses having the function, wherein
    the selectable list includes a plurality of icons of the discovered first plurality of wireless communication apparatuses, and
    the display of the selectable list is based on a response, from the discovered first plurality of wireless communication apparatuses, that indicates the presence of the function;
  control selection of the content data by a first tap operation on the thumbnail of the content data displayed on the display screen;
  control selection of a first wireless communication apparatus from the selectable list of the discovered first plurality of wireless communication apparatuses by a second tap operation on a first icon of the first wireless communication apparatus displayed on the display screen;
  control the display screen, to concurrently display the thumbnail of the content data, a process type list of the selected first wireless communication apparatus, and the plurality of icon of the discovered first plurality of wireless communication apparatuses, based on the selection of the first wireless communication apparatus, wherein
    the process type list includes a plurality of processes, and
    the plurality of processes is executable by the selected first wireless communication apparatus;
  select a specific process of the plurality of processes by a third tap operation, wherein the specific process is associated with the function;
  control execution of a connection process, to connect the second wireless communication apparatus to the selected first wireless communication apparatus, based on the selection of the specific process; and
  control transmission of the content data, from the second wireless communication apparatus to the selected first wireless communication apparatus, based on the execution of the connection process, the first tap operation, and the second tap operation.

6. The wireless communication apparatus according to claim 1, wherein the at least one processor is further configured to broadcast a probe request as a device discovery request.

7. The wireless communication apparatus according to claim 1, wherein the at least one processor is further configured to:
  receive a probe response that is transmitted as a device discovery response from the plurality of peripheral wireless communication apparatuses, and
  discover the plurality of peripheral wireless communication apparatuses based on the probe response.

8. The wireless communication apparatus according to claim 1, wherein the at least one processor is further configured to control a service discovery associated with the discovered plurality of peripheral wireless communication apparatuses.

9. The wireless communication apparatus according to claim 1, wherein the at least one processor is further configured to:
  control the display screen to display a connection method list;
  select an item from the displayed connection method list; and
  control the execution of the connection process based on the selected item.

10. The wireless communication apparatus according to claim 1, wherein the at least one processor is further configured to control the display screen to display the content data, at a time of the execution of the connection process.

11. The wireless communication apparatus according to claim 1, wherein
  the at least one processor is further configured to change a display mode of the icon of the selected first peripheral wireless communication apparatus to indicate that an operation is required on the selected first peripheral wireless communication apparatus for the connection process, and
  the change in the display mode corresponds to a change in one of a brightness, a color, or a size of the icon.

12. The wireless communication apparatus according to claim 1, wherein
  the first process corresponds to display of the content data by the selected first peripheral wireless communication apparatus, and
  a second process of the plurality of processes corresponds to upload of the content data by the selected first peripheral wireless communication apparatus.

* * * * *